(12) United States Patent
Scott

(10) Patent No.: US 6,358,343 B1
(45) Date of Patent: Mar. 19, 2002

(54) METHOD FOR MANUFACTURING PLASTIC DRUMS

(76) Inventor: C. Winfield Scott, 154 Commerce Blvd., Cincinnati, OH (US) 45243

(*) Notice: Subject to any disclaimer, the term of this patent is extended or adjusted under 35 U.S.C. 154(b) by 0 days.

(21) Appl. No.: 09/470,646

(22) Filed: Dec. 22, 1999

(51) Int. Cl.[7] ............................................. B32B 31/16
(52) U.S. Cl. ...................... 156/69; 156/73.1; 156/242; 156/292; 156/309.6
(58) Field of Search .................. 156/69, 73.1, 73.5, 156/292, 308.2, 309.6, 242

(56) References Cited

U.S. PATENT DOCUMENTS

| | | | |
|---|---|---|---|
| 2,741,402 A | 4/1956 | Sayre | 222/215 |
| 3,934,780 A | 1/1976 | Flax | 228/2.3 |
| 4,201,306 A | 5/1980 | Dubois et al. | 220/5 R |
| 4,353,761 A | * 10/1982 | Woerz et al. | 156/69 |
| 4,356,926 A | 11/1982 | Priestly et al. | 220/67 |
| 4,371,574 A | 2/1983 | Shefford | 428/35 |
| 4,402,451 A | 9/1983 | Woerz et al. | 229/5.5 |
| 4,503,103 A | 3/1985 | Shefford | 428/35 |
| 4,769,095 A | * 9/1988 | Sager | 156/69 |
| 4,784,709 A | * 11/1988 | Unger et al. | 156/69 |
| 4,941,584 A | 7/1990 | Bowers et al. | 220/5 R |
| 4,962,862 A | 10/1990 | Farrington et al. | 220/613 |
| 5,064,485 A | * 11/1991 | Smith et al. | 156/69 |
| 5,137,166 A | * 8/1992 | Unger et al. | 220/613 |
| 5,193,715 A | 3/1993 | Schultz | 220/675 |
| 5,263,606 A | 11/1993 | Dutt et al. | 220/613 |
| 5,465,856 A | 11/1995 | Sheffler | 215/370 |
| 5,553,753 A | 9/1996 | Abplanalp | 222/387 |
| 5,568,876 A | 10/1996 | Schutz | 220/254 |
| 5,853,100 A | 12/1998 | Kars | 220/254 |
| 6,045,280 A | 4/2000 | Nadel et al. | 401/122 |

FOREIGN PATENT DOCUMENTS

EP 0523433 B1 3/1996

OTHER PUBLICATIONS

International Search Report issued regarding corresponding International Application No. PCT/US00/34884 (mailed Mar. 30, 2001).

* cited by examiner

*Primary Examiner*—James Sells
(74) *Attorney, Agent, or Firm*—Thompson Hine LLP

(57) ABSTRACT

A method for forming a plastic drum including the steps of selecting a lower component having a bottom and a generally cylindrical side wall, the side wall defining an opening, and selecting an upper component having a center section and an annular end portion, the end portion having an annular slot. The method further includes the step of locating the upper component on the lower component such that the upper component covers the end opening and such that at least part of the side wall of the lower component is received in the annular slot, and welding the portion of the side wall received in the annular slot to the upper component.

9 Claims, 2 Drawing Sheets

METHOD FOR MANUFACTURING PLASTIC DRUMS

The present invention is directed to a method for manufacturing plastic drums, and more particularly, to a method for joining two components to form a plastic drum.

BACKGROUND OF THE INVENTION

Plastic drums are typically used to store and transport a wide variety of materials, including fluids as well as dry and powdered materials. Existing plastic drums are typically formed by blow molding, which forms the drum as a single, unitary piece of plastic. However, blow molding drums requires a relatively high weight of materials, has a long cycle time (i.e. up to several minutes per drum), and does not provide precise tolerances in the finished drum. It is known that producing parts by injection molding may reduce cycle times and the weight of the required materials. Injection molding also produces higher-precision parts. However, it is not practical to injection mold a single, unitary drum. Instead, two or more injection molded parts must be joined together to form a drum. The separate parts must be joined together with sufficient strength to ensure that the resulting drum can withstand various forces, such as internal pressure forces and/or external forces applied to the drum during loading, transportation, and the like. Accordingly, there is a need for a method for joining two components together to form a plastic drum in a quick and efficient manner such that a strong connection is formed between the two components to form a durable, robust drum.

SUMMARY OF THE INVENTION

The present invention is a method for joining two components together to form a durable, robust plastic drum in a quick and efficient manner such that there is a strong connection between the components of the drum.

In a preferred embodiment, the invention is a method for forming a plastic drum comprising the steps of selecting a lower component having a bottom and a generally cylindrical side wall, the side wall defining an opening, and selecting an upper component having a center section and an annular end portion, the end portion having an annular slot. The method further comprises the step of locating the upper component on the lower component such that the upper component covers the end opening and such that at least part of the side wall of the lower component is received in the annular slot, and welding the portion of the side wall received in the annular slot to the upper component.

Accordingly, it is an object of the present invention to provide a method for joining two components together to form a plastic drum in a quick and efficient manner such that there is a strong connection between the two components. Other objects and advantages of the present invention will be apparent from the following description and the accompanying drawings.

DETAILED DESCRIPTION

Figure 1:
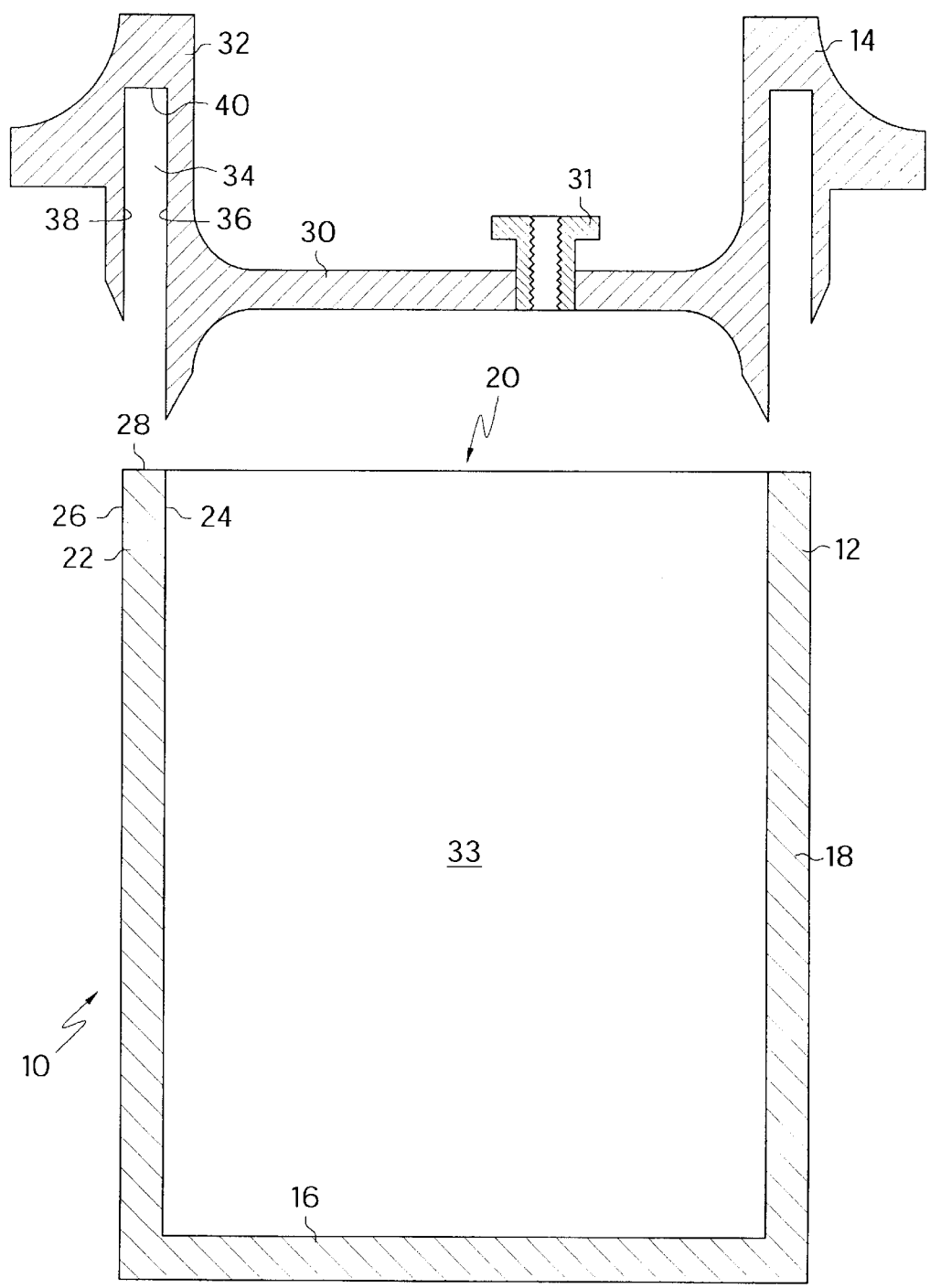
FIG. 1 is a side cross section of a drum formed by the method of the present invention, shown in its unassembled state.

As shown in FIG. 1, the present invention is a plastic drum 10 which includes a lower component 12 and an upper component 14. The lower component 12 includes a bottom 16 and a generally cylindrical side wall 18 that defines a generally circular opening 20. The side wall 18 includes an upper portion 22 having an inner wall 24 and an outer wall 26, and a generally flat end face 28.

Figure 2:
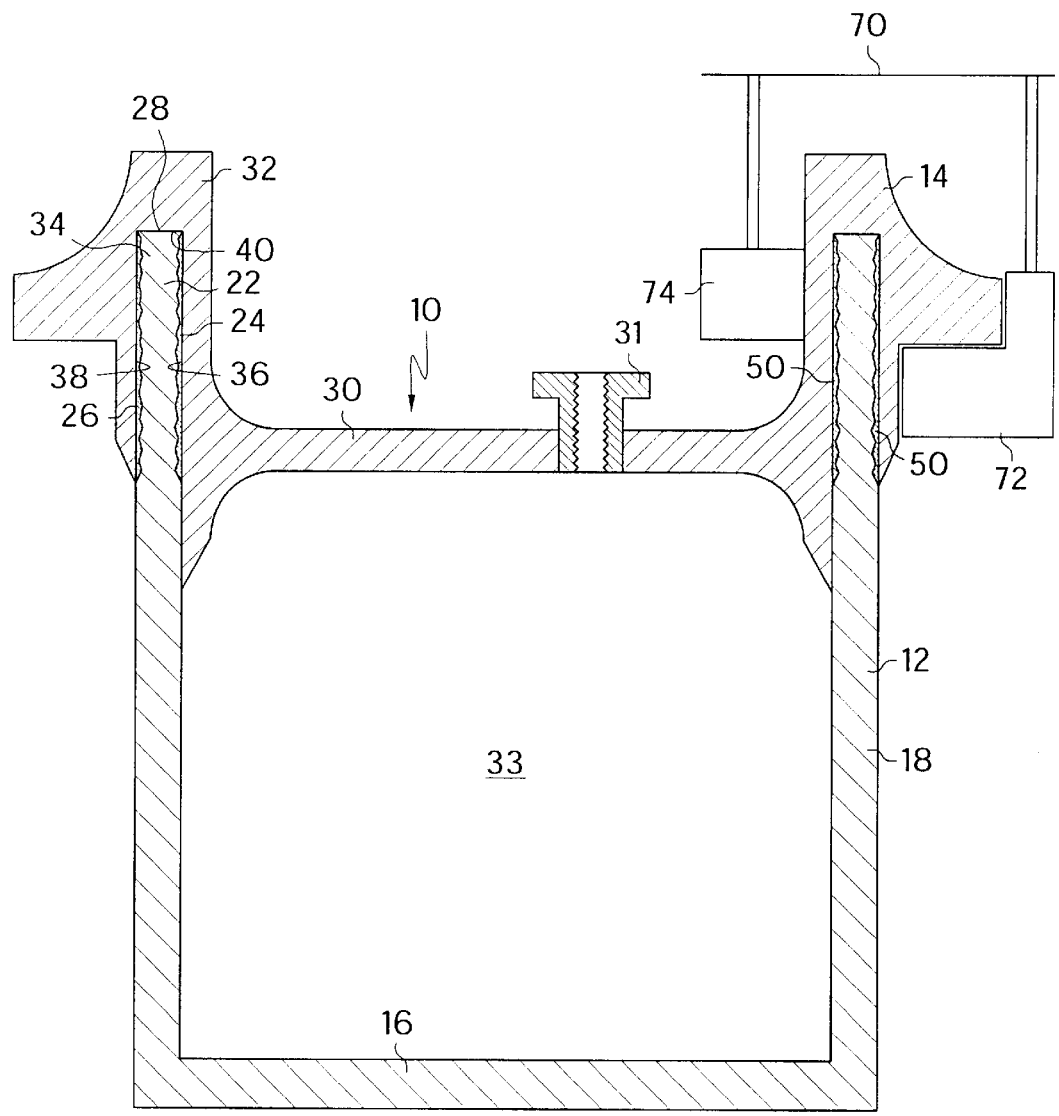
FIG. 2 is a side cross section of the drum of FIG. 1 shown in its assembled state, along with a welding tool.

The upper component 14 is shaped to cover the opening 20 when the upper component is coupled to the lower component 12. The upper component 14 includes a center section 30 that is generally circular in top view, and an annular end portion 32 located around the perimeter of the center section. The center portion 30 of the upper component 14 has one or more threaded bung holes 31 (only one bung hole 31 being shown in FIGS. 1–2) to provide access to the inner cavity 33 of the drum 10 when the drum 10 is fully assembled. The end portion 32 extends generally perpendicular to the plane of the center section 30, and includes an annular slot 34 having an inner wall 36, an outer wall 38, and a generally flat end surface 40. The upper component 14 and lower component 12 both are preferably made of plastic, including but not limited to polyethylene or olefins, and both the upper and lower component are preferably formed by injection molding. However, the components 12, 14 may be formed by other methods, such as blow molding or vacuum molding In order to couple the upper component 14 to the lower component 12, the upper component is placed onto the lower component such that the upper component covers the opening 20, and the upper portion 22 of the lower component 12 is received in the annular slot 34 of the upper component 14 (see FIG. 2). The annular slot 34 is sized to closely receive the upper portion 22. Thus, the inner wall 24 of the upper portion 22 is located adjacent to the inner wall 36 of the annular slot 34, and the outer wall 26 of the upper portion 22 is located adjacent the outer wall 38 of the annular slot. Once the upper component 14 is properly located on the lower component 12, the components 12, 14 are welded together, preferably by either sonic welding or heat welding, although other types of welding or joining (such as adhesives) may be used without departing from the scope of the present invention. In this manner, the inner wall 24 of the upper portion 22 is welded to the inner wall 36 of the annular slot 34, and the outer wall 26 of the upper portion 22 is welded to the outer wall 38 of the annular slot 34. The end surface 40 of the slot 34 is not welded to the end face 28 of the upper portion 22. A welding tool 70 having a outer welding block 72 and an inner welding block 74 is schematically shown in FIG. 2. Such a welding tool 70 is illustrative of one type of welding tool that may be used to attach the upper and lower components.

When the components 12, 14 are joined using either heat welding or sonic welding, portions of the inner 36 and outer 38 walls of the annular slots 34, as well as portions of the upper portion 22 of the lower component 12, are melted, and the melted portions flow or intermingle together. Once the source of heat or sonic waves is removed, the intermingled portions harden, thereby coupling the upper and lower components together. In this manner, a weld zone, generally designated 50, is formed. Because of the weld zone 50 extends along the junction of the inner walls 24, 36 and outer walls 26, 38 of the annular slot 34 and upper portion 22, large surface areas of the upper 14 and lower components 12 are welded together, which results in a strong connection between the upper and lower components. In a preferred embodiment, the inner wall 36 of the annular slot 34 is between about ½" and about 4" long, and the outer wall 38 of the annular slot 34 is between about ½" and about 4" long.

The upper 14 and lower 12 components are preferably formed entirely of plastic, and thereby when heat or sonic welding is utilized to join the components, no extra materials (for example, a metal, heat-conducting ring) are required. In this manner, the lower component 12 is directly welded to the upper component 14.

Having described the invention in detail and by reference to the preferred embodiments, it will be apparent that modifications and variations thereof are possible without departing from the scope of the invention.

What is claimed is:

1. A method for forming a plastic drum comprising the steps of:
   selecting a lower component made primarily of plastic and having a bottom and a generally cylindrical side wall, said side wall defining an opening;
   selecting an upper component made primarily of plastic and having a center section and an annular end portion, said end portion having an annular slot, said annular slot having an inner wall and an outer wall;
   locating said upper component on said lower component such said upper component covers said end opening and such that at least part of said side wall of said lower component is received in said annular slot; and
   welding, by sonic welding, at least part of the portion of said side wall received in said annular slot to said upper component such that said side wall is welded to said inner wall and said outer wall.

2. The method of claim 1 wherein said lower component and said upper component are made of plastic, and wherein said side wall is welded to said upper component by heat welding.

3. The method of claim 1 wherein said inner wall is between about ½" and about 4" long and said outer wall is between about ½" and about 4" long.

4. The method of claim 1 wherein said lower component and said upper component are made entirely of plastic, and wherein said upper and lower component are formed by injection molding.

5. The method of claim 1 wherein said portion of said side wall received in said annular slot is closely received in said annular slot during said locating step.

6. The method of claim 1 wherein said annular slot includes a generally flat end surface, and wherein said upper portion includes a generally flat end face that engages said end surface of said annular slot during said locating step.

7. The method of claim 1 wherein said welding step includes melting portions of said lower component and said upper component such that said melted portions intermingle, and allowing said intermingled portions to harden.

8. A method for forming a plastic drum comprising the steps of:
   selecting a lower component made primarily of plastic, formed by injection molding and having a bottom and a generally cylindrical side wall, said side wall defining an opening;
   selecting an upper component made primarily of plastic, formed by injection molding and having a center section and an annular end portion, said end portion having an annular slot;
   locating said upper component on said lower component such said upper component covers said end opening and such that at least part of said side wall of said lower component is closely received in said annular slot; and
   welding at least part of the portion of said side wall received in said annular slot to said upper component.

9. A method for forming a plastic drum comprising the steps of:
   selecting a lower component having a bottom and a generally cylindrical side wall, said side wall defining an opening;
   selecting an upper component having a center section and an annular end portion, said end portion having an annular slot;
   locating said upper component on said lower component such said upper component covers said end opening and such that at least part of said side wall of said lower component is closely received in said annular slot; and
   welding at least part of the portion of said side wall received in said annular slot to said upper component, wherein said upper and lower component are stationary relative to each other during said welding.

* * * * *